United States Patent Office 2,766,261
Patented Oct. 9, 1956

2,766,261

PROCESS FOR THE PREPARATION OF ETHYLENE OXIDE

Ralph Landau, East Hills, N. Y., assignor to Chempatents, Inc., New York, N. Y., a corporation of Delaware No Drawing. Application February 5, 1954, Serial No. 408,598

6 Claims. (Cl. 260—348.5)

This invention relates to processes for the preparation of ethylene oxide by the partial oxidation of ethylene by means of gaseous oxygen in the presence of silver containing catalysts.

More particularly, it relates to such a process wherein a gaseous reaction mixture containing appropriate amounts of ethylene and oxygen is contacted with the catalyst arranged in an elongated reaction zone at a temperature in the range of 150 to 400° C., the catalyst comprising essentially an intimate mixture of 3 to 30% by weight finely divided silver and 1 to 25% of the weight of the silver of an alkaline earth carboxylate (the latter being in mildly alkaline condition), coated upon the previously prepared rough outer surface of substantially dense, irregular particles of an inert, inorganic, compound support material, the surface area of the support material being in the range of about 0.002 to 10 square meters per gram, the reaction zone being substantially tubular and of about 0.5 to 2 inches in diameter and of a length in the range of about 10 to 25 feet, the catalyst being of an average diameter of at least about 0.2 inch and not greater than 50% of the diameter of the reaction zone, the reaction mixture being passed therein at a pressure in the range of about 15 to 500 p. s. i. g. (pounds per square inch gauge) at a gaseous flow rate in the range of 5 to 60 feet per second (measured at 60° F. and 1 atm.) the residence time of the gaseous mixture in the reaction zone (based on the volume measured at 60° F. and 1 atm.) being in the range of about 0.1 to 6 seconds and the pressure drop from end to end of the reaction zone being in the range of 6 to 50 p. s. i. g., the desired ethylene oxide product being recovered from the resulting reaction mixture.

By means of this critical combination of reaction zone catalyst relationship and gaseous mixture flow conditions, and especially high output of ethylene oxide product is obtained for a given capital investment cost; and this is particularly advantageous from the economic viewpoint.

The preparation of ethylene oxide by the catalytic oxidation of ethylene is known, and has achieved noteworthy commercial success. Generally, such processes involve the reaction of oxygen with relatively pure ethylene diluted with inert gas, at temeratures of about 150 to 400° C. in the presence of active silver catalysts. The catalytic material may be coated upon the wall of the reaction vessel, or upon metal rods or tubes, or may be formed into pellets, e. g., of 2.5 mm. thickness and 5 mm. diameter, or it may be coated upon or mixed with a support material.

It has been found by actual tests that the highly porous or gel type materials, such as activated alumina having a surface area of the order of 200 square meters per gram are unsuitable as supports for active silver. When such material is coated with finely divided sliver and then used as a catalyst for the preparation of ethylene oxide, it has been found that only carbon dioxide and water are obtained. In other words, such catalysts are inoperative for the preparation of ethylene oxide by the selective partial oxidation of ethylene with molecular oxygen.

In the early stages of the development of the ethylene oxide art, it was thought that the inclusion of alkali or alkaline earth compounds in the carrier might improve the catalysts. Subsequent work, however, indicated that potassium and caesium compounds are detrimental in their action, and that weak bases such as calcium and magnesium hydroxide cause a decrease in the chemical efficiency of the process and are therefore undesirable. More recent work suggests compounds of the strong bases sodium and lithium as promoters; however, this later work apparently was not concerned with durability or long life of the catalyst.

The art is confronted with the problem of providing active silver surface catalysts useful for the preparation of ethylene oxide, and of good stability and durability.

It has been found in accordance with the invention that by contacting a gaseous reaction mixture containing appropriate amounts of ethylene and oxygen together with inerts with a catalyst comprising essentially an intimate mixture of 3 to 30% by weight finely divided silver and 1 to 25% of the weight of the silver of an alkaline earth carboxylate (the latter being in mildly alkaline condition) coated upon irregular support particles having a surface area in the range of about 0.002 to 10 square meters per gram, arranged in an elongated tubular reaction zone of relatively small diameter, that a surprisingly high output of ethylene oxide product is obtained for a given plant investment if the gaseous mixture is reacted therein at a temperature in the range of 150 to 400° C., a pressure in the range of about 15 to 500 p. s. i. g., a gaseous flow rate in the range of 5 to 60 feet per second, a pressure drop from end to end of the reaction zone in the range of 6 to 50 p. s. i. g. and a residence time of the gaseous mixture in the reaction zone in the range of about 0.1 to 6 seconds.

The objects achieved in accordance with the invention as described herein include the provision of a process for the preparation of ethylene oxide by the partial oxidation of ethylene with molecular oxygen by contacting the reaction gaseous mixture with a catalyst comprising essentially an intimate mixture of 3 to 30% by weight finely divided silver and 1 to 25% of the weight of the silver of an alkaline earth carboxylate (the latter being in mildly alkaline condition) coated upon irregular support particles having a surface area in the range of about 0.002 to 10 square meters per gram, arranged in an elongated tubular reaction zone of relatively small diameter, the reaction mixture being passed therein at a temperature in the range of 150 to 400° C., a pressure in the range of about 15 to 500 p. s. i. g., a gaseous flow rate in the range of 5 to 60 feet per second, a pressure drop from end to end of the reaction zone in the range of 6 to 50 p. s. i. g. and a residence time of the gaseous mixture in the reaction zone in the range of about 0.1 to 6 seconds; and other objects which will be apparent as details or embodiments of the invention are set forth hereinafter.

In order to facilitate a clear understanding of the invention, the following preferred specific embodiments are described in detail.

*Example 1*

A reactor containing a plurality of substantially vertical stainless steel tubes of about 0.867 inch diameter and about 23 feet in height, surrounded by a temperature regulating bath, such as diphenyl ether or a hydrogenated or partially hydrogenated aromatic material or the like, is filled to a 20 foot depth per tube with a silver containing catalyst.

This catalyst is prepared by mixing an aqueous solution of silver nitrate with a slight stoichiometric excess of aqueous sodium hydroxide, settling, and thoroughly washing the silver oxide precipitate. This is slurried in an acidic aqueous solution of calcium lactate or barium lactate (the pH thereof being in the range of about 4 to 6.5), to provide about 5 to 12% of calcium or barium by weight relative to the atoms of silver therein. Approximately ⅜ inch irregular particles of ceramically bonded fused alumina having a roughened outer surface and a surface area in the range of 0.002 to 10 square meters per gram, freshly washed with water, are then added to the above slurry mixture. The resulting mixture is evaporated slowly, with slow stirring, until each particle is well coated with the slurry. The coated particles are dried, e. g., at about 105–110° C. for about 4 to 10 hours, and then roasted at about 330 to 400° C. for about 1 to 5 hours in the presence of air or inert gas such as nitrogen. There is no need of a reducing gas atmosphere in this step.

The surface area is critical, inasmuch as it has been found by tests that such catalysts prepared with supports having surface areas of the order of 200 square meters per gram are inoperative, giving only carbon dioxide and water. Also, smooth spheres such as aluminum spheres or glass spheres when coated with the silver gave materials which were inoperative as catalysts for the present purpose; inasmuch as only carbon dioxide and water were obtained therewith, or very little if any reaction took place.

The preferred alumina particles are ceramically bonded fused alpha alumina particles having the following physical properties (ASTM method):

| | |
|---|---|
| Porosity_____percent (vol.)__ | 41–45 |
| Water absorption_____percent (wt.)__ | 20–23 |
| Bulk density (indiv. support)_____gr./cc__ | 2.1–1.9 |
| Surface area (nitrogen absorption) sq. m./gr__ | 0.025–0.057 |

A gaseous reaction mixture made up of oxygen and ethylene is passed to the reactor. In this reactor, a part of the ethylene is partially oxidized to ethylene oxide. The resulting reacted gaseous mixture is passed from this reactor to a scrubber wherein it is contacted with an aqueous scrubbing liquor, preferably at 10 or more atmospheres pressure, gauge. This liquor absorbs the ethylene oxide therefrom to form a rich liquor, which is passed from scrubber to a recovery system. In this system, the ethylene oxide product is separated and passed to storage leaving a lean recycle liquor which is recycled to the scrubber. Additional make-up water may be added as required. Other suitable recovery methods may be used, if desired, e. g., using a solid adsorbent. If desired, the water solution may be converted to ethylene glycol and the latter recovered, in the known manner. The scrubbed gas is passed from the scrubber and may be discarded or otherwise used. Alternatively, it may be divided into two parts, one part of which is recycled and the other of which is purged.

In this example, the reactor bath is maintained at 247° C., the inlet pressure of the gas is 150 p. s. i. g., the gaseous mixture flow rate is 29 feet per second, the residence time of the reaction mixture in the reaction tube is about 0.7 second, the pressure drop from end to end of each reaction tube is about 15 p. s. i. g. The term "residence time" is defined as the time required for a volume of gas equal to the volume of the empty reactor tube to pass therethrough, the gas volume being measured at 60° F. and 1 atm. pressure conditions, in accordance with accepted usage.

If desired, the purged gases may be further reacted to provide additional ethylene oxide in an additional reaction system similar to the foregoing.

In this system, about 30% of the ethylene feed is reacted, and in this reacted portion about 65% to 70% is converted to ethylene oxide; e. g. with a feed of about 5% (vol.) carbon dioxide, about 5% ethylene, about 6% oxygen, and the balance nitrogen to make up to volume, the outlet contains about 1% ethylene oxide. By operating under these conditions, the output of the reactor is many times the corresponding output which would be obtained if the pressure were atmospheric.

The process of the invention is particularly advantageous at inlet pressures of at least 75 and especially 150 p. s. i. g. or above.

*Example 2*

A barium lactate promoted catalyst is prepared similar to that of Example 1, except using silicon carbide as the support; and comparable test results were obtained.

With irregular ⅜ inch catalysts of this type loaded into a vertical reactor of one inch internal diameter and 42 inches deep, surrounded by a bath maintained at 245° C., feeding a reaction mixture of 5% ethylene, 6% oxygen and 89% nitrogen at 200 liters per hour, gave a conversion of 29% (i. e. percentage of ethylene reacted) and a selectivity of 76.3% (percentage of ethylene oxide formed based on ethylene reacted).

With slightly higher temperature, the conversion was 75% and the selectivity 63% giving an over-all yield of 47.3% per pass, and this is believed to be higher than anything reported heretofore. This was maintained for well over 200 hours of operation, clearly demonstrating the durability and ruggedness of the barium lactate promoted catalyst.

In another test of this type, using barium acetate as the promoter, good results were obtained, and the yield was maintained for well over 400 hours.

Corresponding calcium promoted catalysts also give these desirable results.

However, alkali metal carboxylate promoted catalysts of this type are not acceptable according to present standards. They have very poor activity or durability and therefore are not suitable for commercial purposes.

The alkaline earth carboxylate promoted catalysts show much higher durability than corresponding oxide, hydroxide or carbonate type catalysts.

The catalysts of the invention containing the intimate mixture of silver or silver oxide with the alkaline earth carboxylate or derivative as promoters are not to be confused with other types of catalysts, such as those having an alkaline earth metal incorporated in the carrier but not in intimate mixture with the silver or silver oxide. The latter are regarded as not having the long life or durability characteristics of the catalysts of the invention. In addition, the catalysts of the invention are not to be confused with the highly alkaline type promoted catalysts such as those promoted with sodium hydroxide or the like or a salt thereof with a weak acid, which catalysts are prepared from a silver oxide slurry in aqueous solutions which are strongly alkaline. In contrast thereto, definitely acidic solutions are used in making the slurries from which the catalysts of the invention are prepared.

For comparing catalysts as to alkalinity, a 15 gram sample of the catalyst may be shaken thoroughly with 100 mls. of water and the resulting mixture tested for alkalinity. In this way, it is found that the alkaline earth carboxylate type catalysts of the invention, such as those of the above examples containing 10 to 15% silver by weight are only mildly alkaline after drying (and even after roasting they are only slightly more alkaline).

This is in marked contrast to comparative catalysts such as one prepared from barium hydroxide (of equivalent silver and barium content) which is strongly alkaline after drying, and after roasting becomes very strongly alkaline. In terms of hydrogen ion concentration, these catalysts show a more than tenfold higher alkalinity than do the catalysts of the present invention.

The high effectiveness and durability of the catalysts of the invention are indeed surprising if one considers the clear prior art requirement of strongly alkaline type barium material in catalysts.

In actual plant type operation using long narrow tubes, there is a tendency for the pressure drop from end to end of the tubes to increase with time. After it builds up to about 50 p. s. i. g. (pounds per square inch gauge), the operation becomes uneconomic due to high costs of pumping, etc.; and the plant is shut down and charged with new catalyst. The active life or operation time of a plant charged with an alkaline earth carboxylate catalyst of the invention (calcium, barium, or strontium material of pH not over about 10) is about twice that of a similar plant charged with a corresponding catalyst which does not contain such a carboxylate. This means that the plant output for a given catalyst charge is doubled.

Comparable results to the foregoing are achieved with various modifications thereof, such as the following. The reaction zone diameter may be in the range of about 0.5 to 2 inches; the irregular catalyst particles may be of an average diameter of at least about 0.2 inch up to not greater than 50% of the diameter of the reaction zone; e. g. 3–8 mesh or larger (U. S. sieve); the reaction zone may be of a length in the range of about 10 to 25 feet; the temperature may be in the range of about 150 to 400° C., desirably 200 to 325° C., and preferably 220 to 280° C.; the pressure of the gaseous feed mixture at the inlet may be in the range of about 15 to 500 p. s. i. g., desirably 75 to 350, and preferably 150 to 225; the flow rate of the gaseous mixture may be in the range of 5 to 60 feet per second, desirably 10 to 50 and preferably 20 to 45; the residence time of the reaction mixture in the reaction zone may be in the range of about 0.1 to 6 seconds, desirably 0.3 to 2.5, and preferably 0.4 to 1.5; and the pressure drop from end to end of the reaction zone may be in the range of 6 to 50 p. s. i. g.

The catalyst may contain about 3 to 30% by weight silver. It may contain about 1 to 25% based on the weight of the silver of the organic carboxylate salt of an alkaline earth metal as promoter.

As to the gaseous reaction mixture, it should contain 3 to 20% oxygen, desirably 4 to 10 and preferably 5 to 8, 0.5 to 10% ethylene, desirably 1.5 to 7% and preferably 1.5 to 5%, and the remainder inert gases, e. g., up to about 10% carbon dioxide and the remainder nitrogen. The outlet gas from the reactor may contain 0.1 to 8% ethylene and 0.1 to 3.0% ethylene oxide.

The ethylene gas is preferably substantially free of other combustible materials or hydrocarbons. However, ethylene gas containing a substantial proportion of paraffins of 1 to 2 carbon atoms may be used. The paraffins tend to increase the tendency toward total combustion of that part of the ethylene which is reacted; and accordingly, a chlorinated biphenyl vapor may be blended with the reaction mixture in a small proportion sufficient to counteract this effect of the paraffins. The chlorinated biphenyl may have a boiling point in the range of 380 to 460° C., preferably 400 to 430° C.

The pressure of the reaction mixture should be sufficiently high to provide the desired high output of ethylene oxide from the reaction system. However, if the pressure is too high, there is a tendency towards polymerization or other undesirable reactions which may coat the catalyst with an undesirably waxy or resinous layer which destroys the effectiveness of the catalyst. When the pressure drop becomes too high, the cost of the power requirements associated therewith make such an operation disadvantageous from the economic viewpoint.

The reaction mixture, temperature, catalyst, and contact time or space velocity of the gaseous mixture are interrelated and suitable combinations thereof are selected to give the desired optimum output and concentration of ethylene oxide in the exit gas.

Inasmuch as the desired formation of ethylene oxide is only one of the many reactions or effects which may occur upon subjecting the mixture of ethylene and oxygen to contact with the catalyst at elevated temperatures, it has been regarded as convenient to refer to the percentage of ethylene consumed in the reaction step relative to the feed as "conversion," and the percentage of ethylene oxide formed relative to the ethylene consumed as "selectivity." The yield of ethylene oxide relative to the ethylene feed is the product of the "selectivity" times the "conversion," e. g., on a mol basis. These percentage ethylene effects and terms may be represented as follows:

Ethylene plus oxygen gives:
    A. Ethylene oxide (desired)
    B. Carbon dioxide and water (not desired)
    C. Unreacted ethylene plus oxygen (not desired)

Selectivity is:
$$\frac{A}{A+B}$$

Conversion is:
$$\frac{A+B}{A+B+C}$$

Yield is:
$$\frac{A}{A+B+C}$$

The foregoing are indicated as major considerations. However, as undesirable effects to be avoided, it may be noted that the ethylene oxide formed should not be rearranged to acetaldehyde, which would be an undesirable side product, or which might be further oxidized; and, of course, the ethylene oxide formed should not be further oxidized to give carbon dioxide and water.

It is indeed surprising that ethylene oxide may be produced with such high output efficiencies in accordance with the invention, especially when one keeps in mind the many undesirable effects or side reactions that may occur during or simultaneously with the desired partial oxidation reaction.

In view of the foregoing disclosures, variations, and modifications thereof will be apparent to one skilled in the art and it is intended to include within the invention all such variations and modifications except as do not come within the scope of the appended claims.

I claim:

1. A process for the preparation of ethylene oxide by the partial oxidation of ethylene which comprises passing a gaseous reaction mixture containing 0.5 to 10% by volume of ethylene and 3 to 20% oxygen together with inerts in contact with a silver containing catalyst arranged in an elongated reaction zone at a temperature in the range of 150 to 400° C., said catalyst comprising essentially an intimate mixture of 3 to 30% by weight finely divided silver and 1 to 25% of the weight of the silver of an alkaline earth carboxylate (the latter being in mildly alkaline condition) coated upon the previously prepared rough outer surface of substantially dense, irregular particles of an inert, inorganic compound support material, said zone being tubular and of about 0.5 to 2 inches in diameter, said catalyst particles being of an average diameter of at least about 0.2 inch and not greater than 50% of the diameter of the reaction zone, said reaction zone being of a length in the range of about 10 to 25 feet, the gaseous mixture being passed therein at a pressure in the range of 15 to 500 p. s. i. g., at a gaseous flow rate in the range of 5 to 60 feet per second, the residence time of said mixture in said zone being in the range of about 0.1 to 6 seconds, and the pressure drop from end to end of said reaction zone being in the range of 6 to 50 p. s. i. g., and recovering ethylene oxide from the resulting reaction mixture.

2. A process of claim 1 wherein the catalyst support particles have a surface area in the range of about 0.002 to 10 square meters per gram.

3. A process of claim 2 wherein the inlet pressure is at least 75 p. s. i. g.

4. A process of claim 3 wherein the catalyst has been roasted at 300 to 500° C. for 0.5 to 24 hours.

5. A process of claim 4 wherein the alkaline earth is calcium.

6. A process of claim 4 wherein the alkaline earth is barium.

References Cited in the file of this patent

UNITED STATES PATENTS

| | | |
|---|---|---|
| 2,177,361 | Carter | Oct. 24, 1939 |
| 2,241,019 | Metzer | May 6, 1941 |
| 2,424,084 | Finch | July 15, 1947 |
| 2,430,443 | Becker | Nov. 11, 1947 |
| 2,458,266 | Heider | Jan. 4, 1949 |
| 2,477,435 | Aries | July 26, 1949 |
| 2,491,051 | Nevison | Dec. 13, 1949 |
| 2,554,459 | Heider | May 22, 1951 |
| 2,585,479 | Levy | Feb. 12, 1952 |
| 2,585,483 | Mawer | Feb. 12, 1952 |